United States Patent
Ni et al.

(10) Patent No.: US 11,070,598 B2
(45) Date of Patent: Jul. 20, 2021

(54) AUTOMATIC REPORT AND RESOLUTION GENERATION FROM MULTI-PLATFORM COMMUNICATIONS

(71) Applicant: International Business Machines Corporation, Armonk, NY (US)

(72) Inventors: Lin Ni, Shanghai (CN); Enrico James Monteleone, Beijing (CN); Wei Peng Huang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 16/391,529

(22) Filed: Apr. 23, 2019

(65) Prior Publication Data
US 2020/0344279 A1 Oct. 29, 2020

(51) Int. Cl.
| | | |
|---|---|---|
| *G06F 15/16* | (2006.01) | |
| *H04L 29/06* | (2006.01) | |
| *G06F 7/14* | (2006.01) | |
| *H04L 12/26* | (2006.01) | |
| *G06F 3/0484* | (2013.01) | |
| *G06F 40/30* | (2020.01) | |

(52) U.S. Cl.
CPC .......... *H04L 65/403* (2013.01); *G06F 3/0484* (2013.01); *G06F 7/14* (2013.01); *G06F 40/30* (2020.01); *H04L 43/045* (2013.01)

(58) Field of Classification Search
CPC ... H04L 65/403; H04L 43/045; G06F 3/0484; G06F 40/30; G06F 7/14
USPC .................................................. 709/204–207
See application file for complete search history.

(56) References Cited

U.S. PATENT DOCUMENTS

| | | | |
|---|---|---|---|
| 6,594,673 B1 | 7/2003 | Smith | |
| 7,392,280 B2 | 6/2008 | Rohall | |
| 7,506,263 B1 | 3/2009 | Johnston | |
| 7,672,953 B2 * | 3/2010 | McAniff | H04L 51/32 709/214 |
| 8,364,514 B2 * | 1/2013 | Macbeth | H04L 67/22 709/205 |
| 8,510,664 B2 | 8/2013 | Rueben | |
| 8,768,307 B1 * | 7/2014 | Heins | H04L 51/16 709/203 |
| 9,477,371 B2 * | 10/2016 | Buford | G06F 3/0481 |
| 9,977,829 B2 | 5/2018 | Simske | |
| 2004/0153456 A1 | 8/2004 | Charnock | |

(Continued)

OTHER PUBLICATIONS

Appan et al., "Summarization and Visualization of Communication Patterns in a Large-Scale Social Network," http://sundaram.cs.illinois.edu/pubs/2006/pakdd-camera-ready-pa-hs-bt.pdf, accessed Feb. 20, 2019, 10 pgs.

(Continued)

*Primary Examiner* — Bharat Barot
(74) *Attorney, Agent, or Firm* — Jared L. Montanaro (57) ABSTRACT

A processor may identify that a user has been added to a group of two or more users. One or more communications between the group may be hosted on one or more communication platforms. The processor may analyze each of the one or more communications. The processor may identify, from the analyzing, content of the one or more communications. The processor may generate a report. The report may indicate the content of the one or more communications. The processor may display the report to the user.

17 Claims, 6 Drawing Sheets

(56) References Cited

U.S. PATENT DOCUMENTS

| | | | |
|---|---|---|---|
| 2010/0223335 A1* | 9/2010 | Fu | H04L 12/1818 709/205 |
| 2012/0166534 A1* | 6/2012 | Bentley | H04L 12/1822 709/204 |
| 2013/0006973 A1 | 1/2013 | Caldwell | |
| 2016/0371709 A1* | 12/2016 | Browning | H04L 43/045 |
| 2017/0142036 A1 | 5/2017 | Li | |
| 2018/0189266 A1 | 7/2018 | Venkataraman | |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

Procopio ESI, "Email Thread Visualization," https://www.youtube.com/watch?v=OMOW0ST36hl, published Aug. 22, 2017, printed Feb. 20, 2019, 2 pgs.

Shimada et al., "Conversation summarization using machine learning and scoring method," https://pdfs.semanticscholar.org/3049/3b1119e184376840bf56942084eec496d4c9.pdf, Department of Artificial Intelligence, Kyushu Institute of Technology, accessed Feb. 20, 2019, 6 pgs.

\* cited by examiner

AUTOMATIC REPORT AND RESOLUTION GENERATION FROM MULTI-PLATFORM COMMUNICATIONS

BACKGROUND

The present disclosure relates generally to the field of information comprehension, and more specifically to automatically synopsizing multi-platform group communications for effective understanding by a new user joining the group.

Often, a user may be thrust into a group of other users who have an ongoing conversation. The conversation between the group may have been made over multiple platforms of communication, which may make it difficult for the user thrust into the conversation to fully understand what is being discussed in by the group.

SUMMARY

Embodiments of the present disclosure include a method, computer program product, and system for automatically synopsizing multi-platform group communications for effective understanding by a new user joining the group. A processor may identify that a user has been added to a group of two or more users. One or more communications between the group may be hosted on one or more communication platforms. The processor may analyze each of the one or more communications. The processor may identify, from the analyzing, content of the one or more communications. The processor may generate a report. The report may indicate the content of the one or more communications. The processor may display the report to the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of information comprehension, and more specifically to automatically synopsizing multi-platform group communications for effective understanding by a new user joining the group. While the present disclosure is not necessarily limited to such applications, various aspects of the disclosure may be appreciated through a discussion of various examples using this context.

Often times, a user finds themselves wanting to join an already started, on-going group conversation, or manage the already started, on-going group conversation. However, with many electronic communication platforms (e.g., instant messaging, Email, video-conferencing, etc.) available today, it may be challenging for the user to find and ingest all of the information related to the group conversation as the information may be spread across each of the available communication platforms. This in-turn may make it difficult for the user to fully understand the on-going group conversation and may lead to a delay in the progression of the conversation as the user becomes acquainted with the past happenings of the group via the group conversation. There may be a desire for a user to quickly enter an ongoing conversation by having an automatic synopsis of a group's previous communications related to the entire ongoing conversation.

Accordingly, in some embodiments, a processor may identify that a user has been added to a group of two or more users. One or more communications between the group may be hosted on one or more communication platforms. The processor may analyze each of the one or more communications. The processor may identify, from the analyzing, content of the one or more communications. The processor may generate a report. The report may indicate the content of the one or more communications. The processor may display the report to the user.

For example, a senior engineer may be placed on a project that includes three other engineers and which started two weeks ago. In order to work on the project, the three other engineers may have interacted over two recorded phone conferences, 100 emails, and 200 instant messages. The senior engineer may want to "jump-right-in" on the project and may want to know what has happened from the two recorded phone conferences, 100 emails, and 200 instant messages. A background application (e.g., software, plug-in, etc.) installed on each of the three other engineers (and maybe the senior engineer's) devices may analyze each of the two recorded phone conferences, 100 emails, and 200 instant messages.

The background application may identify that the two recorded phone conferences, 100 emails, and 200 instant messages all relate to the same project. The background application may further identify from the conferences, emails, and instant messages what the main goal of the project is and any delays related to the project (e.g., creating a new homepage for a website, the retrieve command is not working, etc.). The background application may then generate and display a report with the main goal and delays of the project to the senior engineer. The senior engineer may then be able to much more expeditiously understand the project and where in the phase of the project they may best be suited to help.

In some embodiments, the background application may be preinstalled software on one or more communicating devices. In some embodiments, the background application may be software installed at the behest of an employer on each device used by their employees. In some embodiments, the background application may identify the relation by incorporating natural language processing to determine keywords related to the project, e.g., "Update on Project: 12345," "Project Name: 67890," etc., and/or by determining context of a conversation after the keyword, e.g., "In regard to Project: 12345 (first instant message) . . . the project is going well (thirtieth instant message), etc."

In some embodiments, when analyzing each of the one or more communications, the processor may identify each of the two or more users in the one or more communications. The processor may access each of the one or more communication platforms. The processor may determine that each of the two or more users are a part of a first communication found in a first communication platform.

For example, a computer system may identify that a new financial auditor has joined an ongoing financial auditing team. The financial auditing team may be notified of the new financial auditor joining the team via email; the computer system may then analyze the email for the names of the individuals already on the auditing team. The computer system may then access the entire email platform used by the auditing team and identify emails that include each of the individuals identified from the introductory email. The computer system may additionally access an instant messaging platform used by the auditing team and identify instant messages that include each of the individuals identified from the introductory email. The computer system will then allow the new financial auditor to be provided not only with email communications from the auditing team, but instant messages.

In some embodiments, the computer system may create a timeline associated with the auditing team. That is, as the auditing team was created and expanded with new financial auditors, and/or members of the team were replaced, etc., the computer system may have kept a ledger of communications between the original auditing team before the new financial auditors each arrived. Keeping a ledger of communications can lessen the time needed for the computer system to go back and catalogue communications and thus allow the new financial auditor(s) to receive a synopsis of the entire auditing process regardless of if the auditing team now only includes the members at the time the new financial auditor(s) are incorporated into the group.

In some embodiments, the processor may identify, using natural language processing techniques, one or more characteristics (e.g., topics, sentiment of the users, most active/least active working hours of the group of users, etc.) of the first communication. The processor may tag the first communication with a first indicator that details the one or more characteristics of the first communication. Following the example above, the computer system may determine from the content and context of the emails that the auditing team is auditing Company X, that there is a discrepancy in the billings of Company X, that the discrepancy is mainly in regard to the second quarter, and that the auditing team is getting frustrated with the amount of time required for the audit. The computer system may generate an indicator that includes metadata that describes Company X, the issues to be resolved by the audit, and the auditing team's sentiment. The computer system may then tag the (group of) emails with the indicator.

In some embodiments, the natural language processing techniques may include the use of a natural language processor that may be a computer module that analyzes communications (e.g., recordings, messages, etc.). The natural language processor may perform various methods and techniques for analyzing communications (e.g., syntactic analysis, semantic analysis, etc.). The natural language processor may be configured to recognize and analyze any number of natural languages. In some embodiments, the natural language processor may include various modules to perform analyses of communications. These modules may include, but are not limited to, a tokenizer, a part-of-speech (POS) tagger (e.g., which may tag each of the one or more sections in which the particular subject is identified), a semantic relationship identifier, and a syntactic relationship identifier.

In some embodiments, the tokenizer may be a computer module that performs lexical analysis. The tokenizer may convert a sequence of characters (e.g., text, images, sounds, etc.) into a sequence of tokens. A token may be a string of characters included in a communication and categorized as a meaningful symbol. Further, in some embodiments, the tokenizer may identify word boundaries in a communication and break any text within the communication (e.g., from email messages, from closed-captions, etc.) into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in a communication to correspond to a particular part of speech. The POS tagger may read a passage or other text in natural language and assign a part of speech to each word or other token. The POS tagger may determine the part of speech to which a word (or other spoken element) corresponds based on the definition of the word and the context of the word. The context of a word may be based on its relationship with adjacent and related words in a phrase, sentence, or paragraph. In some embodiments, the context of a word may be dependent on one or more previously analyzed communications (e.g., the content of one communication [an email] may shed light on the meaning of one or more subjects in another communication [a teleconference]). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a communication with part of speech categories. In some embodiments, the POS tagger may tag tokens or words of a communication to be parsed by the natural language processing system.

In some embodiments, the semantic relationship identifier may be a computer module that may be configured to identify semantic relationships of recognized subjects (e.g., words, phrases, images, etc.) in a communication. In some embodiments, the semantic relationship identifier may determine functional dependencies between entities and other semantic relationships.

Consistent with various embodiments, the syntactic relationship identifier may be a computer module that may be configured to identify syntactic relationships in a communication composed of tokens. The syntactic relationship identifier may determine the grammatical structure of sentences such as, for example, which groups of words are associated as phrases and which word is the subject or object of a verb. The syntactic relationship identifier may conform to formal grammar. It is noted that the natural language processor and each of its associated modules helps in identifying the sentiment, content, and context of the one or more communications.

In some embodiments, the processor may determine that each of the two or more users are a part of a second communication found in a second communication platform. The processor may identify one or more characteristics of the second communication. The processor may tag the second communication with a second indicator that details the one or more characteristics of the second communication. The processor may analyze the first indicator and the second indicator. The processor may determine, from the analyzing of the first indicator and the second indicator, that the first communication and the second communication include the same content. The processor may merge the first communication and the second communication in the report.

Again following the example above, the computer system may now analyze the instant messages between the individuals in the auditing group. The computer system may then identify from the instant messages that the auditing team is auditing Company X, that there is a discrepancy in the billings of Company X, that the discrepancy is mainly in regard to the second quarter, and that the auditing team is getting frustrated with the amount of time required for the audit. The computer system may generate an indicator that includes metadata that describes Company X, the issues to be resolved by the audit, and the auditing teams sentiment. The computer system may then tag the (group of) instant messages with the indicator.

The computer system may then compare the indicator for the emails against the indicator for the instant messages and determine that the metadata included in both indicators is the same (or substantially the same by reaching a threshold amount of similarity). The computer system may then display the content (e.g., metadata, the auditing teams goals, sentiments, resolutions, etc.) of the emails and instant messages to the users as a combined (e.g., overall) synopsis of the work being done by the auditing group and how the new financial auditor can help with the auditing of Company X.

In some embodiments, if the first communication and the second communication are substantially different (e.g., do not reach a threshold degree of similarity) the computer system may display the report to the new financial auditor with a segmented (e.g., fragmented, portioned, etc.) display where the information associated with the first communication is separately shown from the second communication.

In some embodiments, when generating the report, the processor may determine an access tier of the user. The access tier may indicate a specific part of the content of the one or more communications to be displayed to the user. The processor may tailor, based on the access tier of the user, how the report will be displayed on a graphical user interface (GUI) to the user. For example, a processor may identify that a user has joined an online group that has been active for 30 days. The processor may additionally identify, from a profile associated with the user, that the user is a peer to everyone else in the online group. The processor may then display a report to the user indicating who each person in the online group is and what topics are of a main concern for the online group. This may be in contrast to a user who is determined to be an owner of the online group; where in such a case, the processor may display a report to the user that details statistics of the online groups interactions (e.g., time spent discussing work, recreation, etc.) and/or details fluctuations of the online groups overall temperament (e.g., October 1: happy with project, October 8: dismissive of project, etc.).

In some embodiments, the processor may identify that the user is designated as a part of an onboarding access tier. The processor may determine that the specific part of content of the one or more communications to display to the user are a current sentiment level of the group, one or more profiles of key users of the group, and a singular synopsis of the one or more communications.

In some embodiments, the processor may analyze the report. The processor may generate, from the analyzing of the report, a predictive outcome for the group. The processor may automatically generate a resolution for the predictive outcome.

For example, a tablet utilizing an application connected to a networked repository may generate a report for a manager of a group. The report may highlight that the group has been on-going for 65 days, that the group includes 10 members, and that the sentiment of the group has changed (e.g., via a sentiment analysis by a natural language processing computer module) from adamant to indifferent over the last 10 days. The report may additionally indicate that the highlight information indicates that the group is likely to fail at their project if sentiment continues for 5 more days.

The report may include this information by the application utilizing information from the repository and making correlations. For instance, the application may have identified that most groups with an indifferent sentiment of a project at 70 days and with eight or more members are 90% likely to forgo a project. The application may then include a warning (e.g., indicator, etc.) on the report that forewarns the manager of the likely foregoing of their group's project if the sentiment continues.

In some embodiments, the report may include a corrective action for the predictive outcome. For instance, following the example above, the application may have additionally identified that groups with eight or more members and which have projects going on greater than 70 days and which report an adamant sentiment each have a very involved manager. The report generated by the application may then indicate that the manager begin engaging in more of the group's activities (e.g., brainstorming sessions, drafting, coding, etc.).

Figure 1:
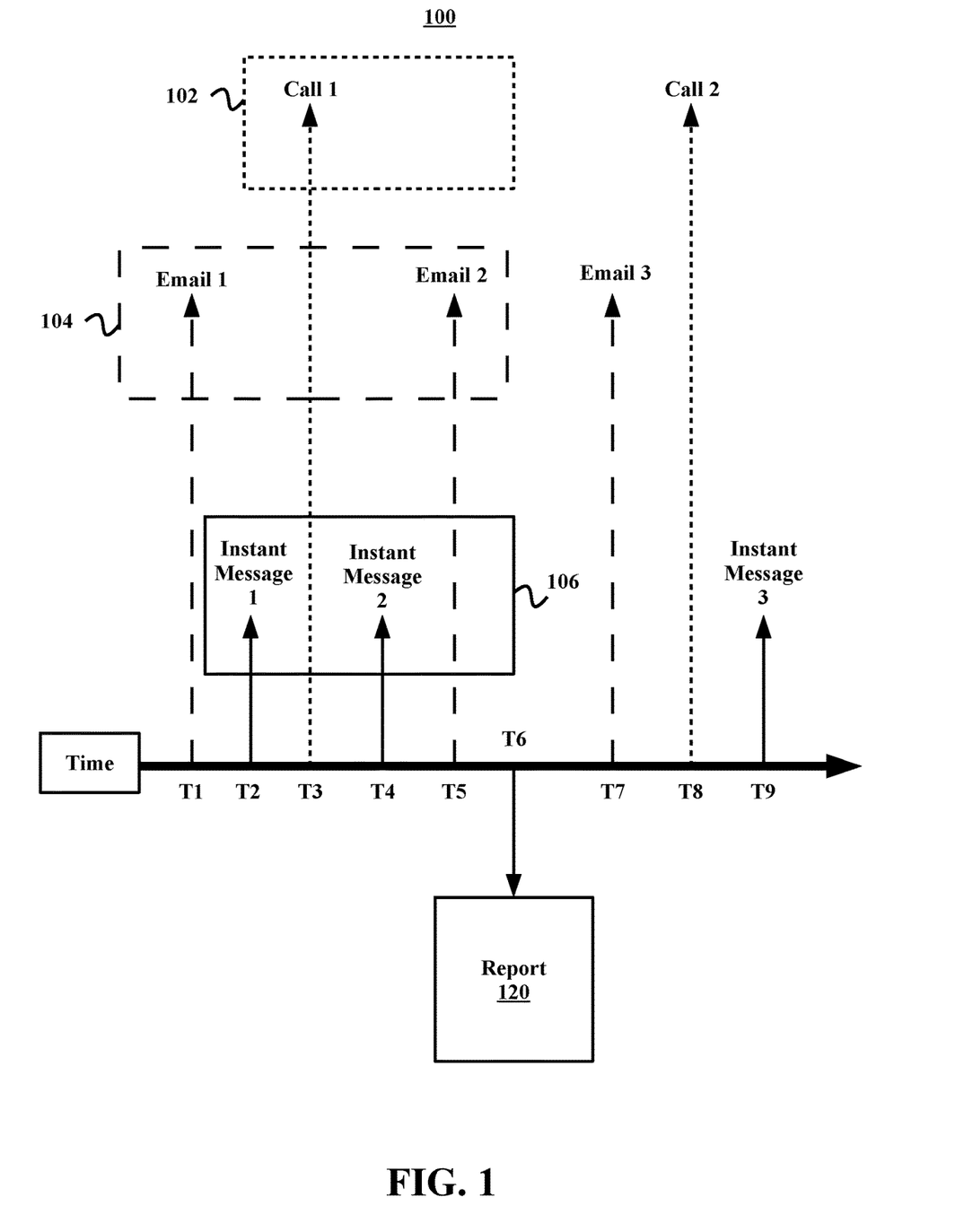
FIG. 1 illustrates an example system for generating a report to display to a user, in accordance with embodiments of the present disclosure.

Referring now to FIG. 1, illustrated is an example system 100 for generating a report to display to a user, in accordance with embodiments of the present disclosure. In some embodiments, the system 100 includes the telephonic platform 102, the electronic messaging (Email) platform 104, and the instant messaging platform 106. In some embodiments, the system 100 includes and/or is managed by a manager (not shown).

In some embodiments, the telephonic platform 102 includes a first call made at time T3 and a second call made at time T8. In some embodiments, the Email platform 104 includes a first email at time T1, a second email at time T5, and a third email at time T6. In some embodiments, the instant messaging platform 106 includes a first instant message (session) at time T2, a second instant message (session) at time T4, and a third instant message (session) at time T9.

In some embodiments, each of the communications (e.g., the calls, emails, and instant messages) indicate communications between a group of users, where the group of users began with the first email communication at time T1. In some embodiments, the (computerized) manager identifies that a new user (not shown) has joined the group of users at time T6. The manager analyzes each of the communications on the telephonic platform 102, the Email platform 104, and the instant messaging platform 106 that were generated before the new user joined the group at time T6.

The manager identifies that only the first call of the telephonic platform 102, that the first and second emails of the Email platform 104, and that the first and second instant messages of the instant message platform 106 were generated before the new user joined the group at time T6 and determines the content in each of the communications. The manager identifies that each of the communications is related (e.g., by common group members identified in each communication and/or from content of the communications) and generates a report 120 of what the group was doing (e.g., working on, tasked with, etc.) before the new user was incorporated into the group. The report 120 is then presented for the new user as a concise synopsis of what the group is doing and how the new user can best be incorporated into the group (e.g., fix an issue that arose, help with future implementations of group project, etc.).

After the incorporation of the new user at time T6, the communications (e.g., the third email, the second call, and the third instant message) now include the new user and will be subsequently analyzed and incorporated into a new report if and/or when a second new user is incorporated into the group of users.

Figure 2A:
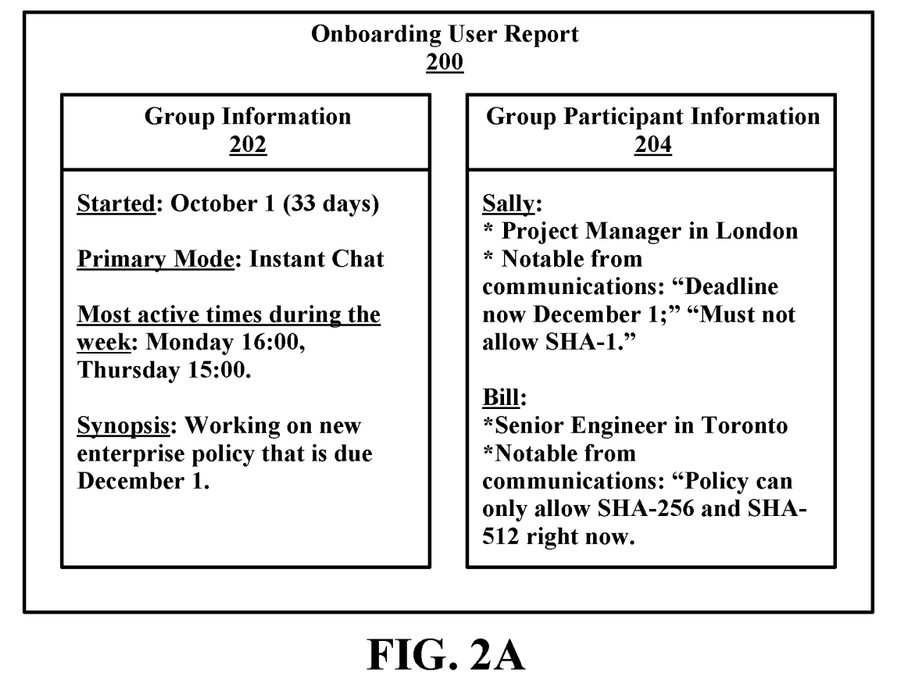
FIG. 2A illustrates an example onboarding user report, in accordance with embodiments of the present disclosure.

Referring now to FIG. 2A, illustrated is an example onboarding user report 200, in accordance with embodiments of the present disclosure. In some embodiments, the onboarding user report 200 is generated by a processor utilizing a background application that analyzes one or more communications on one or more networked (e.g., connected) devices. In some embodiments, the onboarding user report 200 includes group information 202 and group participant information 204.

In some embodiments, the onboarding user report 200 is generated for a user joining an existing group of users as a new member of the group (e.g., have an "onboarding" access tier). The onboarding user report 200 for such a user includes the group information 202 in order for the user to quickly understand the basics of the group, such as when the group started, the primary mode of communication used by the group, the most active times of the group (e.g., so the user knows the most likely times to get ahold of group members), and/or a synopsis of what the group was created for. It is noted that more or less group information 202 may be included in the onboarding user report 202. For instance, a sentiment indicator (e.g., threshold score, emoji, color indicator, etc.) may be included in the group information 202 which may indicate the overall tone of the group before the user begins interacting with the group.

In some embodiments, the onboarding user report 200 for the user joining the existing group of users additionally includes the group participant information 204, which includes the main members (e.g., most active communicators as determined by the number of communications sent by the members) of the group. This may help the user joining the group know who is most helpful with the onboarding process and/or who is too busy to help. In some embodiments, all the members of the group may by synopsized and/or profiled on the group participant information 204 of the onboarding user report 200.

Figure 2B:
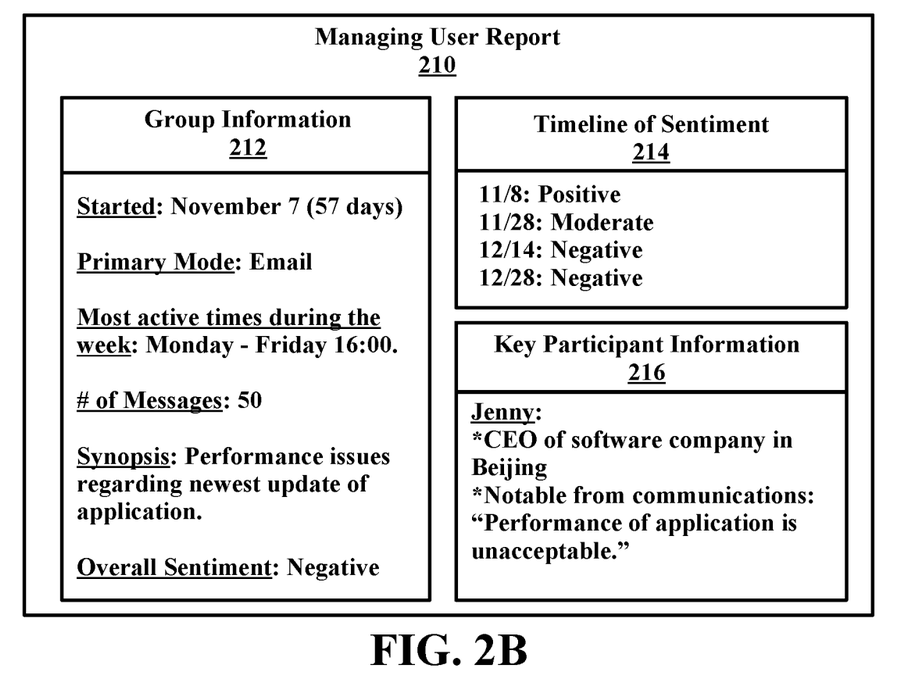
FIG. 2B illustrates an example managing user report, in accordance with embodiments of the present disclosure.

Referring now to FIG. 2B, illustrated is an example managing user report 210, in accordance with embodiments of the present disclosure. In some embodiments, the managing user report 210 is generated by a processor utilizing a background application that analyzes one or more communications on one or more networked (e.g., connected) devices. In some embodiments, the managing user report 210 includes group information 212, a timeline of group sentiment 214, and key participant information 216.

In some embodiments, the managing user report 210 is generated for a user joining an existing group of users as a manager (e.g., administrator, director, etc.) of the group (e.g., having a "managing" access tier). The managing user report 210 for such a user includes the group information 212 in order for the user to quickly understand, the basics of the group, such as when the group started, the primary mode of communication used by the group, the most active times of the group (e.g., so the user knows the most likely times to get ahold of group members), the number of communications between the group, a synopsis of what the group was created for and/or what the latest update on the group is (e.g., how far along a project is, if there is an issue with a project, if a deadline will be met/missed, etc.), and/or an overall sentiment of the group (e.g., if the group is upset about the project, perhaps indicating that the manager should step in and help the group, etc.). It is noted, that more or less group information 212 may be included in the managing user report 212. For instance, a sentiment indicator (e.g., threshold score, emoji, color indicator, etc.) may be included in the group information 212 which may indicate the overall sentiment/tone of the group before the user begins interacting with the group.

In some embodiments, the managing user report 210 for the manager joining the existing group of users includes the timeline of sentiment 214, which includes a visual of dates when the group's sentiment (e.g., tone, enthusiasm, etc.) for the work changes and/or how the group's sentiment was on a given day. The timeline of sentiment 214 may help the manager determine where in the life of a project/assignment an issue occurred. In some embodiments, the application generating the managing user report 210 may user the timeline of sentiment 214 to determine a predictive outcome (and/or solution to the predictive outcome) of the project if the current sentiment trend continues.

In some embodiments, the managing user report 210 for the manager joining the existing group of users additionally includes the key participant information 216, which includes the most notable member(s) (e.g., highest ranking, biggest client, etc.) of the group. This may help the manager in determining who to most direct correspondence with and/or who should be helped/praised first.

Figure 3:
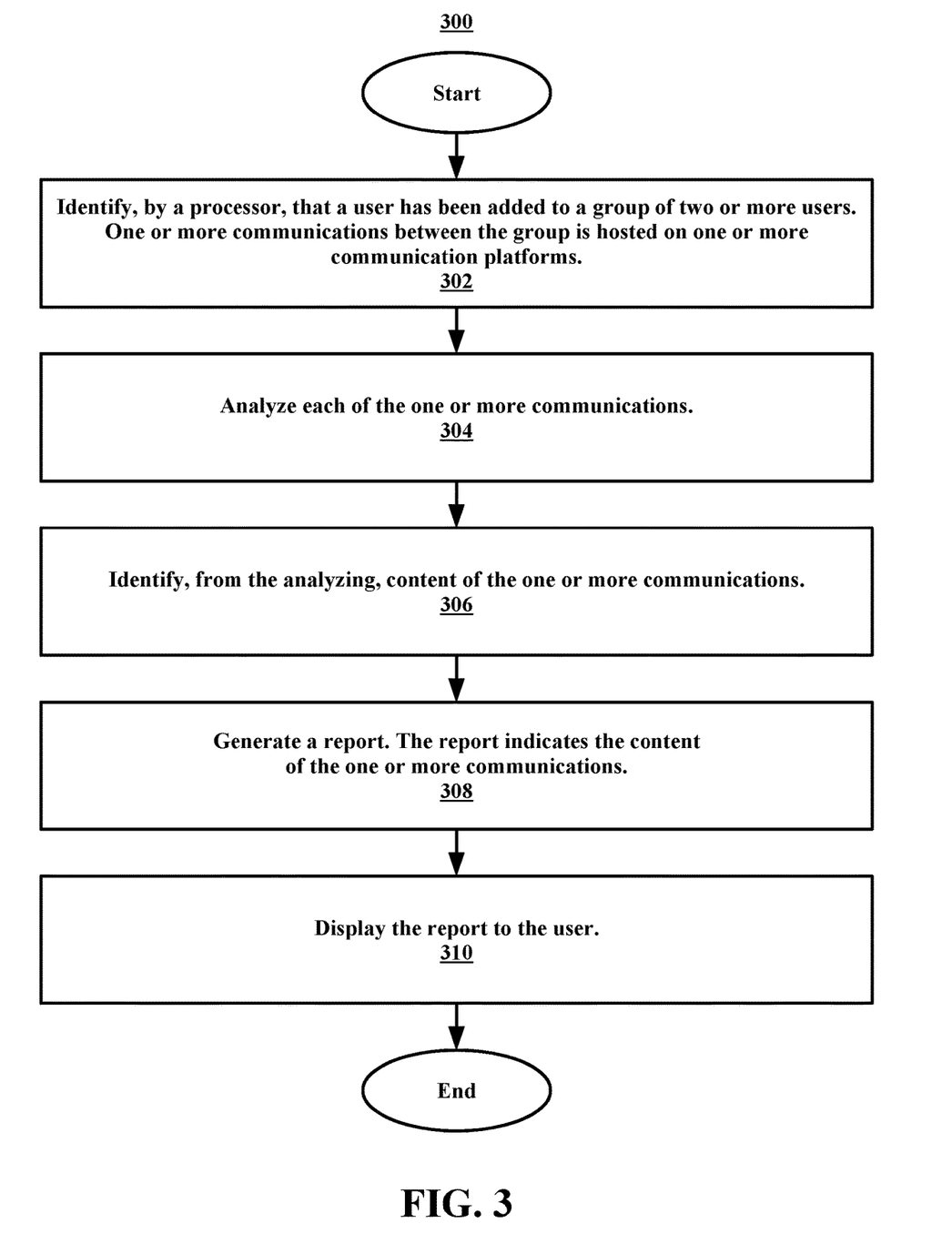
FIG. 3 illustrates a flowchart of an example method for generating a report to display to a user, in accordance with embodiments of the present disclosure.

Referring now to FIG. 3, illustrated is a flowchart of an example method 300 for generating a report to display to a user, in accordance with embodiments of the present disclosure. In some embodiments, the method 300 may be performed by a processor (e.g., in a computer system, etc.). In some embodiments, the method 300 begins at operation 302 where the processor identifies that a user has been added to a group of two or more users. In some embodiments, there may be one or more communications between the group being hosted on one or more communication platforms.

In some embodiments, the method 300 proceeds to operation 304. At operation 304, the processor analyzes each of the one or more communications (across each of the one or more communication platforms). In some embodiments the method 300 proceeds to operation 306, where the processor identifies, from the analyzing, content of the one or more communications (e.g., members of the group, sentiment of the group, the goal of the group, etc.).

In some embodiments, the method 300 proceeds to operation 308. At operation 308, the processor generates a report. In some embodiments, the report indicates the content of the one or more communications. In some embodiments, the method proceeds to operation 310 where the report is displayed to the user. In some embodiments, after operation 310, the method 300 ends.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
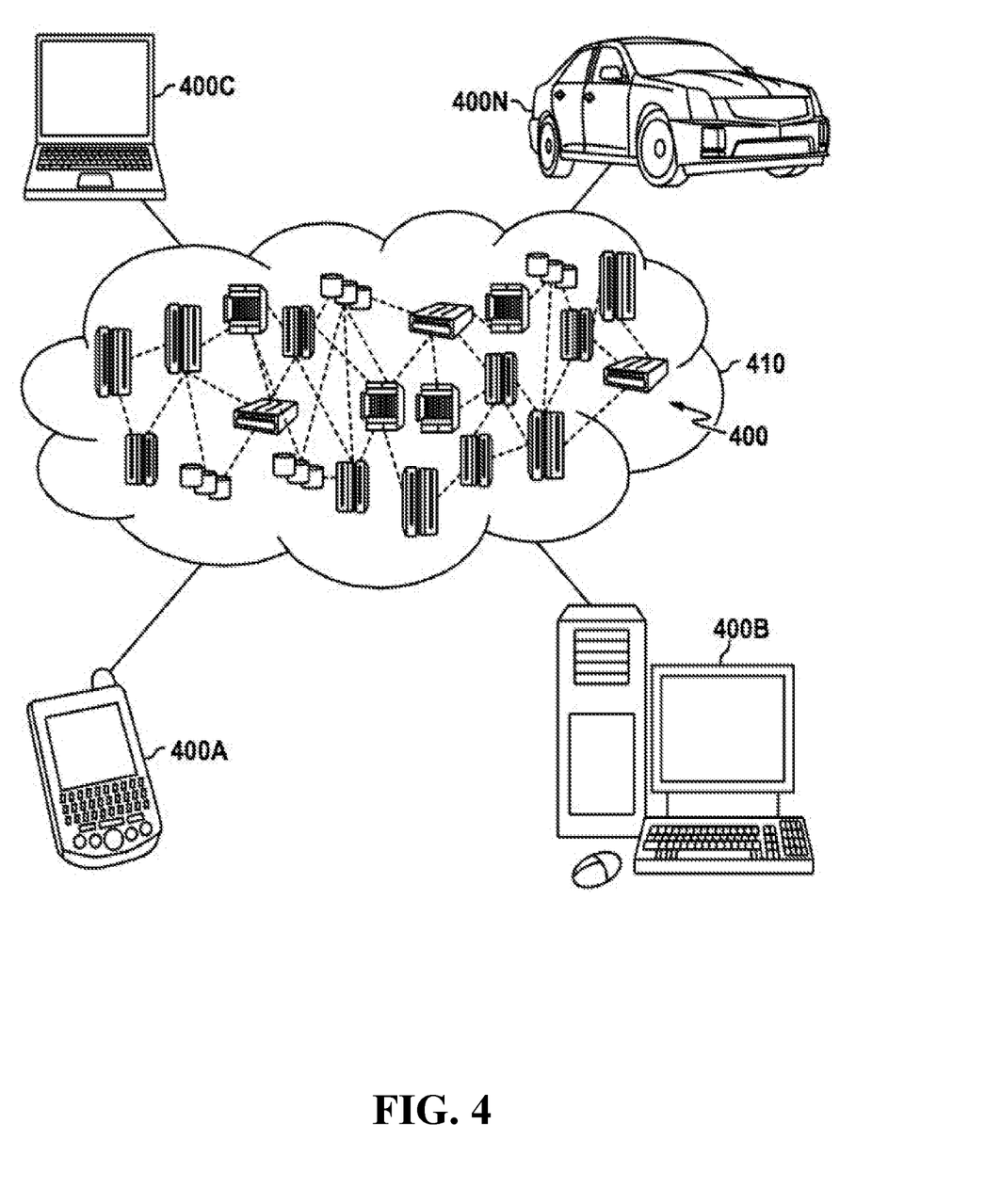
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
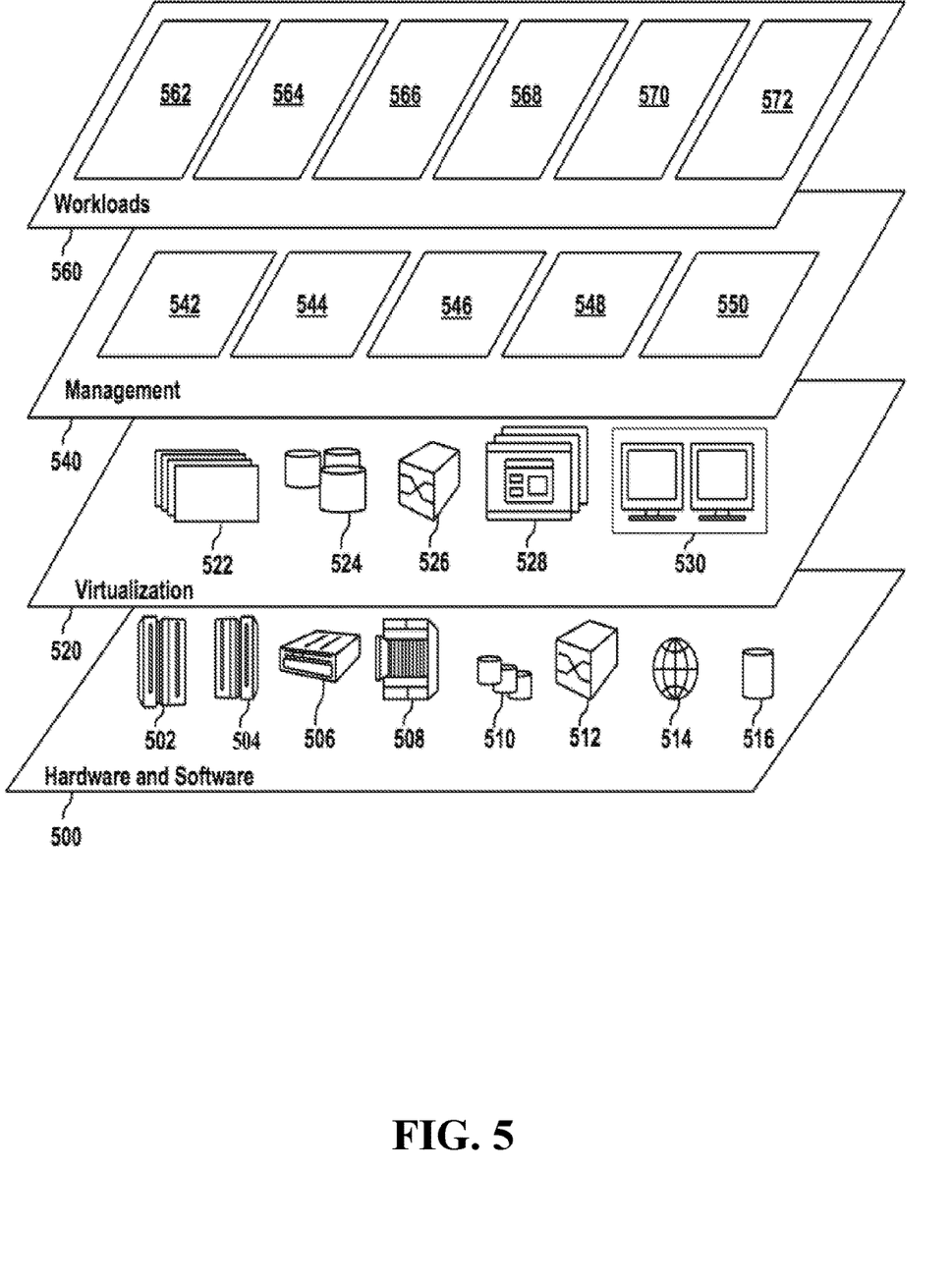
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and I/O throttling 572.

Figure 6:
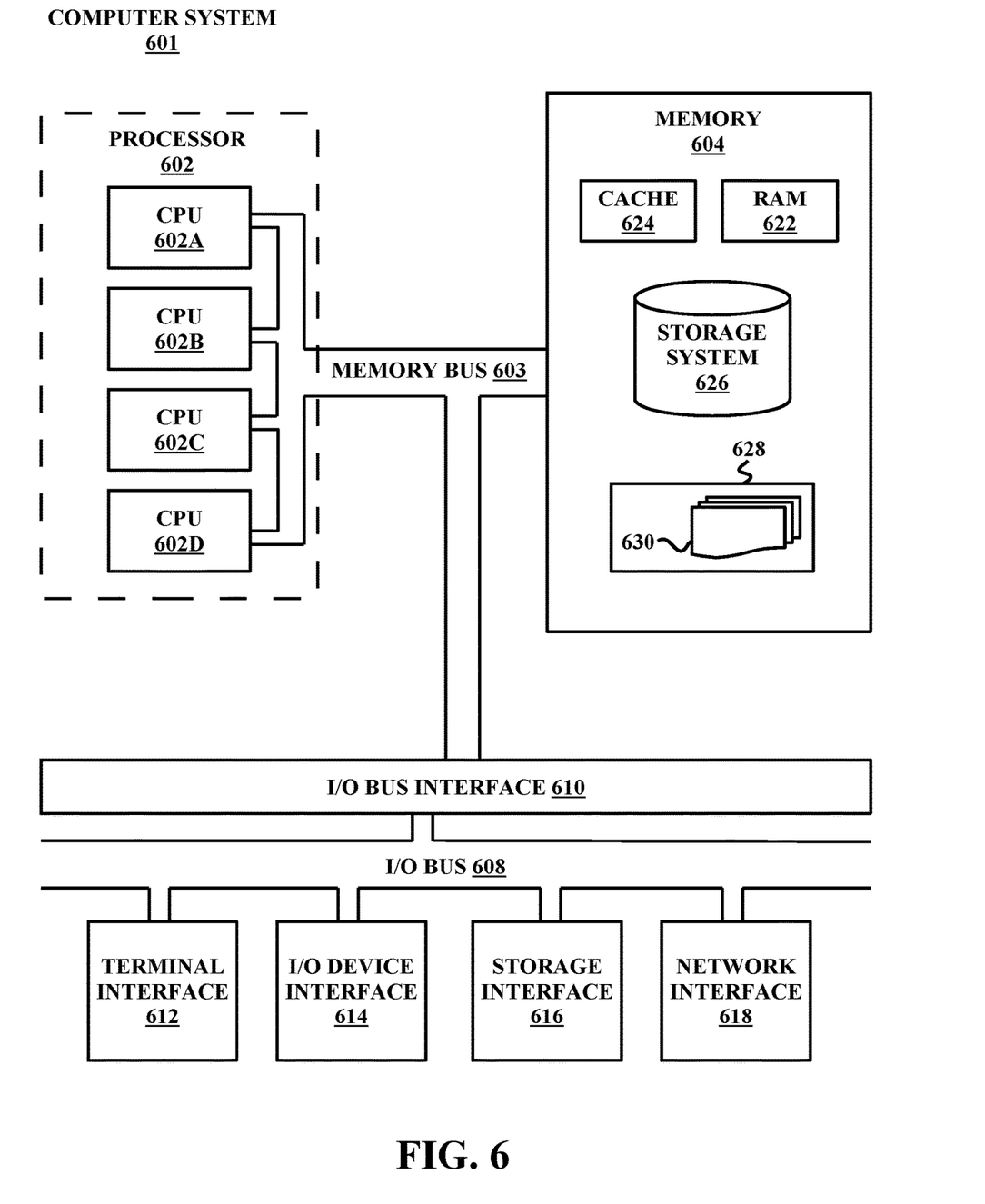
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
identifying, automatically by a processor, that a user has been added to a group of two or more users, wherein one or more communications between the group are hosted on one or more communication platforms;
analyzing each of the one or more communications;
identifying, from the analyzing, content of the one or more communications;
generating a report, wherein the report indicates the content of the one or more communications;
analyzing the report;
generating, from the analyzing of the report, a predictive outcome for the group, wherein the content of the one or more communications of which the report is based indicate a predictable trend from historical data;
generating, automatically, a resolution for the predictive outcome; and
displaying the report to the user.

2. The method of claim 1, wherein analyzing each of the one or more communications comprises:
identifying each of the two or more users in the one or more communications;
accessing each of the one or more communication platforms; and
determining that each of the two or more users are a part of a first communication found in a first communication platform.

3. The method of claim 2, further comprising:
identifying, using natural language processing techniques, one or more characteristics of the first communication; and
tagging the first communication with a first indicator that details the one or more characteristics of the first communication.

4. The method of claim 3, further comprising:
determining that each of the two or more users are a part of a second communication found in a second communication platform;
identifying one or more characteristics of the second communication;
tagging the second communication with a second indicator that details the one or more characteristics of the second communication;
analyzing the first indicator and second indicator;
determining, from the analyzing of the first indicator and the second indicator, that the first communication and the second communication include the same content; and
merging the first communication and the second communication in the report.

5. The method of claim 1, wherein generating the report comprises:
determining an access tier of the user, wherein the access tier indicates a specific part of the content of the one or more communications that is displayed to the user; and
tailoring, based on the access tier of the user, how the report will be display on a graphical user interface (GUI) to the user.

6. The method of claim 5, further comprising:
identifying that the user is designated as a part of an onboarding access tier, wherein the onboarding access tier indicates the user has no previous communications with the group; and
determining that the specific part of the content of the one or more communications to display to the user are a current sentiment level of the group before the user communicates with the group, one or more profiles of key users of the group, and a singular synopsis of the one or more communications.

7. A system comprising:
a memory; and
a processor in communication with the memory, the processor being configured to perform operations comprising:
identifying, automatically, that a user has been added to a group of two or more users, wherein one or more communications between the group are hosted on one or more communication platforms;
analyzing each of the one or more communications;
identifying, from the analyzing, content of the one or more communications;
generating a report, wherein the report indicates the content of the one or more communications;
analyzing the report;
generating, from the analyzing of the report, a predictive outcome for the group, wherein the content of the one or more communications of which the report is based indicate a predictable trend from historical data;
generating, automatically, a resolution for the predictive outcome; and
displaying the report to the user.

8. The system of claim 7, wherein analyzing each of the one or more communications comprises:
identifying each of the two or more users in the one or more communications;
accessing each of the one or more communication platforms; and
determining that each of the two or more users are a part of a first communication found in a first communication platform.

9. The system of claim 8, wherein the operations further comprise:
identifying, using natural language processing techniques, one or more characteristics of the first communication; and
tagging the first communication with a first indicator that details the one or more characteristics of the first communication.

10. The system of claim 9, wherein the operations further comprise:

determining that each of the two or more users are a part of a second communication found in a second communication platform;
identifying one or more characteristics of the second communication;
tagging the second communication with a second indicator that details the one or more characteristics of the second communication;
analyzing the first indicator and second indicator;
determining, from the analyzing of the first indicator and the second indicator, that the first communication and the second communication include the same content; and
merging the first communication and the second communication in the report.

11. The system of claim 7, wherein generating the report comprises:
determining an access tier of the user, wherein the access tier indicates a specific part of the content of the one or more communications that is displayed to the user; and
tailoring, based on the access tier of the user, how the report will be display on a graphical user interface (GUI) to the user.

12. The system of claim 11, wherein the operations further comprise:
identifying that the user is designated as a part of an onboarding access tier, wherein the onboarding access tier indicates the user has no previous communications with the group; and
determining that the specific part of the content of the one or more communications to display to the user are a current sentiment level of the group before the user communicates with the group, one or more profiles of key users of the group, and a singular synopsis of the one or more communications.

13. A computer program product comprising a computer readable storage medium having program instructions embodied therewith, the program instructions executable by a processor to cause the processor to perform a method, the method comprising:
identifying, automatically, that a user has been added to a group of two or more users, wherein one or more communications between the group are hosted on one or more communication platforms;
analyzing each of the one or more communications;
identifying, from the analyzing, content of the one or more communications;
generating a report, wherein the report indicates the content of the one or more communications;
analyzing the report;
generating, from the analyzing of the report, a predictive outcome for the group, wherein the content of the one or more communications of which the report is based indicate a predictable trend from historical data;
generating, automatically, a resolution for the predictive outcome; and
displaying the report to the user.

14. The computer program product of claim 13, wherein analyzing each of the one or more communications comprises:
identifying each of the two or more users in the one or more communications;
accessing each of the one or more communication platforms; and
determining that each of the two or more users are a part of a first communication found in a first communication platform.

15. The computer program product of claim 14, further comprising:
identifying, using natural language processing techniques, one or more characteristics of the first communication; and
tagging the first communication with a first indicator that details the one or more characteristics of the first communication.

16. The computer program product of claim 13, wherein generating the report comprises:
determining an access tier of the user, wherein the access tier indicates a specific part of the content of the one or more communications that is displayed to the user; and
tailoring, based on the access tier of the user, how the report will be display on a graphical user interface (GUI) to the user.

17. The computer program product of claim 16, further comprising:
identifying that the user is designated as a part of an onboarding access tier, wherein the onboarding access tier indicates the user has no previous communications with the group; and
determining that the specific part of the content of the one or more communications to display to the user are a current sentiment level of the group before the user communicates with the group, one or more profiles of key users of the group, and a singular synopsis of the one or more communications.

* * * * *